United States Patent

[11] 3,554,333

[72] Inventors Hermannhans Hoenick
Immendorf;
Heinrich Bernhard Rath, Koblenz-Lutzel
Wolfgang Hess, Rubenach, Germany
[21] Appl. No. 781,860
[22] Filed Dec. 6, 1968
[45] Patented Jan. 12, 1971
[73] Assignee Girling Limited
[32] Priority Dec. 14, 1967
[33] Great Britain
[31] No. 56,848/67

[54] DISC BRAKE AND MULTIPLE ACTUATOR THEREFOR
6 Claims, 5 Drawing Figs.
[52] U.S. Cl..................................................... 188/152,
92/75, 188/72.5, 188/106
[51] Int. Cl....................................................... B60t 11/10
[50] Field of Search........................................ 188/73,
73CC, 152.02, .873, 106P; 92/75, 61

[56] References Cited
UNITED STATES PATENTS
3,403,602 10/1968 Brandon, Jr. ................. 92/75
3,414,090 12/1968 Hambling..................... 188/73

Primary Examiner—George E. A. Halvosa
Attorney—Scrivener, Parker, Scrivener & Clarke ABSTRACT: An hydraulic brake actuator comprising a cylinder containing a pair of pistons having annular skirts which are directed towards one another and are each slidingly sealed on a common sleeve, the sleeve dividing the space enclosed within the cylinder between the two pistons into two separate pressure chambers, having separate inlets for the supply of hydraulic fluid. A disc brake of the sliding yoke type incorporating an hydraulic actuator of the above construction is described in detail.

DISC BRAKE AND MULTIPLE ACTUATOR THEREFOR

This invention relates to hydraulic brakes and more specifically to hydraulic brake actuators which include two separate hydraulic chambers intended for connection to separate sources of hydraulic fluid under pressure, the arrangement being such that the brake will be operated when fluid pressure is applied either to both chambers simultaneously, or to either chamber alone.

An hydraulic brake actuator in accordance with the invention comprises a cylinder containing a pair of pistons having annular skirts directed towards each other, each slidingly sealed over a common sleeve, which divides the cylinder into separate pressure chambers having respective fluid pressure supply inlets.

Particular embodiments of the invention are described below, by way of example only, with reference to the accompanying drawings, in which.

Figure 1:
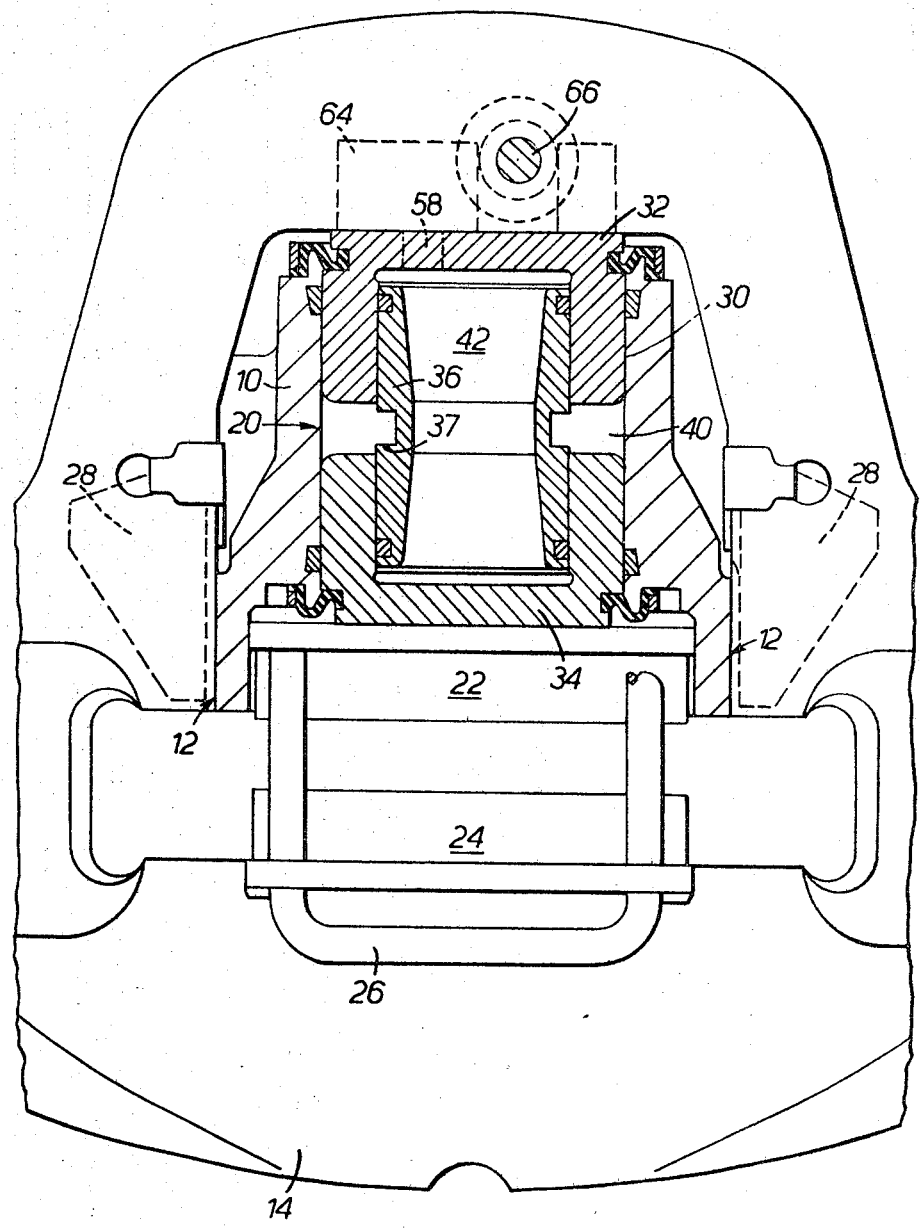
FIG. 1 is a part sectional plan view of a disc brake incorporating an actuator in accordance with the invention.

The brake shown in the drawings in a sliding yoke type disc brake. It comprises a pair of friction pads 22, 24 which engage on opposite sides of a brake disc (not shown). A fixed body member 10 is located on the inboard side of the brake disc, and has on opposite sides a pair of grooves 12 which guide a yoke 14 for sliding movement in the plane of the yoke, perpendicular to the plane of the brake disc. The body is provided with mounting lugs 16, 18 facilitating its secure attachment to a vehicle.

Mounted in the body 10 is an actuator 20 (described in detail below) which acts directly on one friction pad 22 and indirectly, through the yoke 14 on the second friction pad 24. The friction pads are slidably suspended from a U-shaped pad-retaining pin 28 carried by the body 10. The yoke is supported by leaf springs 28 housed in the grooves 12 and is also coupled to the inboard end of the actuator 20 in a manner described in detail below.

Figure 2:
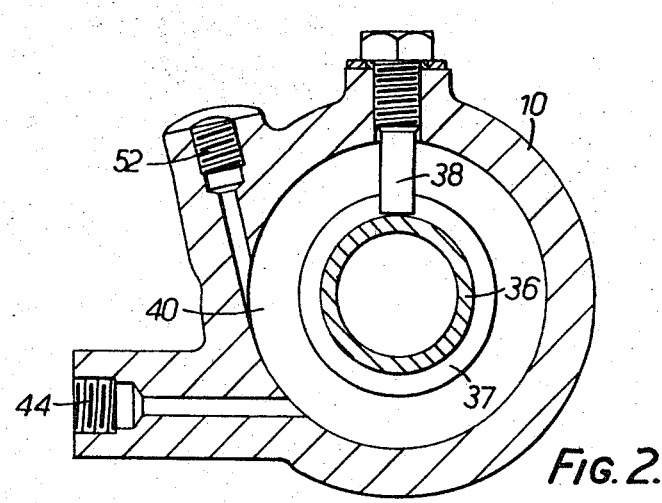
FIG. 2 is a cross section on the line II–II of FIG. 1.
Figure 3:
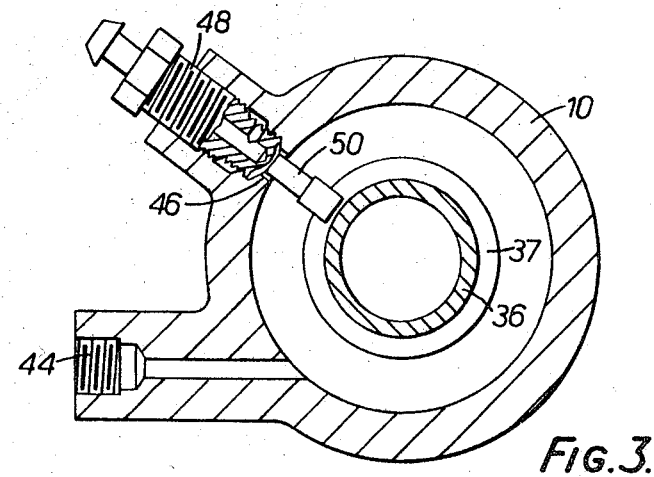
FIG. 3 is a view similar to FIG. 2 showing a possible modification.

As so far described, the brake is of a form which is known per se, but attention is now directed to the construction and arrangement of the actuator 20. Within a cylinder bore 30 in the body 10 is a pair of opposed, cup-shaped pistons 32 and 34, the annular skirts of which are directed towards each other. A sleeve 36 having a peripheral groove 37 is slidably received within the skirts of pistons 32 and 34 and sealed thereto, so as to define separate pressure chambers 40 and 42. As shown in FIG. 2, the groove 37 receives a radial pin 38 which fixes the sleeve 36 against axial movement relative to the body 10, and the pressure chamber 40 is provided with a pressure inlet port 44 and a bleed port 52, normally plugged by a bleed screw (not shown). In the modified arrangement of FIG. 3, the radial pin 38 is replaced by a radial extension 50 of a bleed screw 48 in a bleed port 46.

Figure 4:
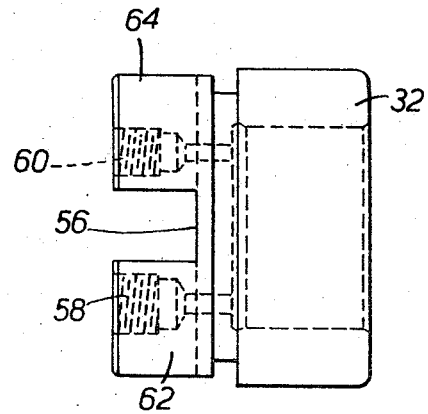
FIG. 4 is a side view of one piston of the actuator of FIG. 1.
Figure 5:
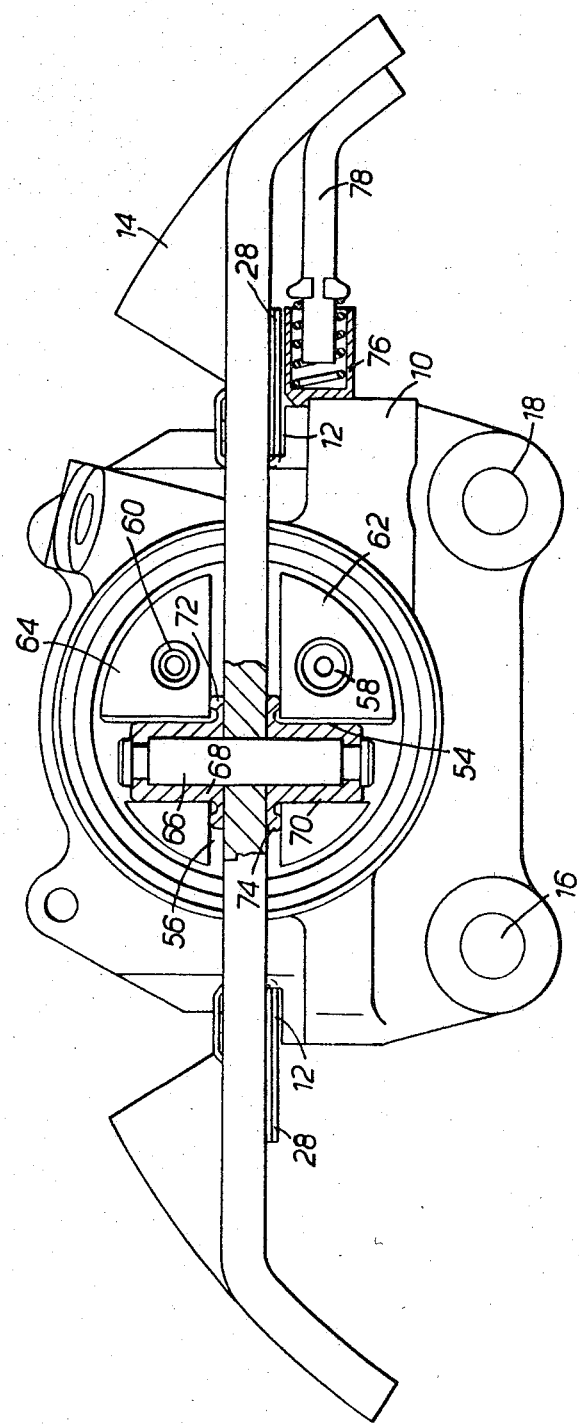
FIG. 5 is a part-sectional elevation of the brake of FIG. 1.

The pressure chamber 42 has its own pressure supply and bleed ports formed in the piston 32, the construction of which is best seen in FIGS. 1, 4 and 5. The piston excess (i.e. that part of piston 32 which normally projects from the body 10 at the inboard end thereof) is formed with a pair of mutually perpendicular, transverse slots 54 and 56, defining four separate bosses, the two larger ones being penetrated respectively by a pressure supply port 58 and a bleed port 60 for the inner pressure chamber 42. Thus, the chambers 40 and 42 have their own separate pressure supply ports which in use will be connected to separate pressure supply systems normally operating in unison, say from a tandem master cylinder. However, in the event of failure of either pressure system, the other will be operable to expand the actuator to apply the brake.

It will be appreciated that if one piston were to be sealed directly against the other, the piston seals would be subjected to a working stroke corresponding to the wear on both friction pads. However, by interposing the sleeve 36, in accordance with the invention, the working stroke on each piston seal is equivalent to the wear on only one friction pad, thus increasing the potential useful life of each seal.

The manner of coupling the yoke 14 to the actuator is best seen in FIG. 5. The yoke has fixed to it a pin 66, the projecting upper and lower ends of which carry nylon bushes 68 and 70 having flanged heads 72 and 74. The bushes locate in the slot 54 and compensate for tolerance variations between the pin 66 and the width of the slot, while the flanges 72 and 74 compensate for tolerance variations between the thickness of the yoke 14 and the width of slot 56. Preferably, and as shown, the slot 54 is offset laterally towards the leading side of the brake, in order to provide more metal in the bosses 62 and 64. The yoke is also biased away from the leading side of the brake (to the right in FIG. 5) by a spring plunger 76 carried by a stem 78 on the yoke, thus taking up any free movement which would otherwise tend to cause impact on forward braking.

It will be apparent to those skilled in the art that the actuator described above could be used in various kinds of brake. Apart from the advantage of reduced seal wear mentioned above, the design of the actuator makes it possible to match generally standardized brakes to differing vehicle requirements by employing pistons and sleeves of different area ratios.

We claim:

1. A hydraulic actuator comprising a cylinder, two unitary pistons spaced apart axially of the cylinder and each being sealingly and slidably received in the cylinder, each piston including an integral annular skirt extending axially toward the other piston, a sleeve having its opposite ends sealingly and slidably received within the skirts of the two pistons respectively, said sleeve dividing the space enclosed within the cylinder into first and second fluid pressure chambers, the first chamber being defined by the cylinder, the outer surface of said sleeve and the respective confronting annular faces of said skirts and the second fluid pressure chamber being defined by the interior of said sleeve and the confronting inner faces of said pistons within said skirts, and two separate fluid supply lines communicating respectively with the two fluid pressure chambers.

2. An actuator as claimed in claim 1, further comprising pin and slot means acting between said sleeve and said cylinder to restrain axial movement of said sleeve relative to said cylinder.

3. An actuator as claimed in claim 1, wherein one of said pistons has an end wall penetrated by said pressure fluid inlet for said chamber within said sleeve.

4. An actuator as claimed in claim 1 in combination with a disc brake structure comprising a sliding yoke and means mounting said yoke for sliding movement in directions parallel with said cylinder, wherein one of said pistons has a projecting portion extending out of said cylinder, recess means in said projecting portion, and means on said yoke engaging in said recesses to restrain said yoke against movement relative to said one piston in directions perpendicular to said cylinder.

5 The combination of claim 4, wherein said recess means comprise two mutually perpendicular intersecting grooves both extending transversely of said one piston, and said yoke has a portion extending through one of said grooves and a pin fast with said yoke received in the other of said grooves to either side of said yoke portion.

6. The combination of claim 5, wherein said pin has opposed end portions, and further comprising two bushes of resilient material, one bush mounted on each said end portion, each bush having tight engagement in said other groove and having a flange making tight engagement in said one groove.